United States Patent [19]

Kakitani

[11] Patent Number: 5,039,921
[45] Date of Patent: Aug. 13, 1991

[54] DISCHARGE LAMP LIGHTING APPARATUS FOR DRIVING DISCHARGE LAMP ACCORDING TO RATING THEREOF

[75] Inventor: Tsutomu Kakitani, Yokohama, Japan

[73] Assignee: Toshiba Lighting and Technology Corporation, Tokyo, Japan

[21] Appl. No.: 558,449

[22] Filed: Jul. 27, 1990

[30] Foreign Application Priority Data

Jul. 28, 1989 [JP] Japan ................................. 1-194353

[51] Int. Cl.⁵ .......................................... H05B 41/36
[52] U.S. Cl. ................................... 315/307; 315/308; 315/DIG. 5
[58] Field of Search ......... 315/224, 307, 308, DIG. 5, 315/DIG. 7

[56] References Cited

U.S. PATENT DOCUMENTS 4,958,108  9/1990  Jorgensen ........................... 315/307

FOREIGN PATENT DOCUMENTS

0127101  12/1984  European Pat. Off.
0241279  10/1987  European Pat. Off.

Primary Examiner—David Mis
Attorney, Agent, or Firm—Cushman, Darby & Cushman

[57] ABSTRACT

A discharge lamp lighting apparatus according to this invention includes an inverter circuit for supplying a high frequency power source to a discharge lamp having one of different ratings, a voltage detecting coil of an inverter transformer for detecting a load voltage applied from the inverter circuit to the discharge lamp, a current transformer for detecting a load current supplied from the inverter circuit to the discharge lamp, and a control section and an oscillation circuit for controlling the power source supplying operation of the inverter circuit based on detection outputs of the voltage detection coil and current transformer. The control section and oscillation circuit sequentially raise an output of the inverter circuit at the starting time of the discharge lamp, identifies the type of the discharge lamp according to the starting voltage at the lighting time of the discharge lamp, and controls the starting voltage and current of the discharge lamp according to the type of the discharge lamp thus identified.

14 Claims, 10 Drawing Sheets

| $I_L$ (A) | $V_{20}$(V) | f(KHZ) |
|---|---|---|
| 0 | 100 | 60 |
| 0.01 | 100 | 59.5 |
| 0.02 | 100 | 59 |
| 0.10 | 100 | 55 |
| 0.10 | 90 | 55.5 |
| 0.10 | 80 | 56 |
| 0.10 | 0 | 60 |
| 0 | 110 | 59.5 |
| 0.01 | 110 | 59 |
| 0.02 | 110 | 58.5 |
| 0.10 | 110 | 54.5 |
| 0.10 | 100 | 55 |
| 0.10 | 90 | 55.5 |
| 0.10 | 0 | 60 |

FIG. 7A

| $I_L$ (A) | $V_{20}$(V) | f(KHZ) |
|---|---|---|
| 0 | 300 | 48 |
| 0.01 | 300 | 47.5 |
| 0.02 | 300 | 47 |
| 0.34 | 300 | 42 |
| 0.34 | 290 | 42.5 |
| 0.34 | 280 | 43 |
| 0.34 | 200 | 45 |
| 0.34 | 0 | 50 |

DISCHARGE LAMP LIGHTING APPARATUS FOR DRIVING DISCHARGE LAMP ACCORDING TO RATING THEREOF

BACKGROUND OF THE INVENTION

1. Field of the Invention

This invention relates to a discharge lamp lighting apparatus, and more particularly, to a discharge lamp lighting apparatus which lights a discharge lamp at a high frequency, can light different types of discharge lamps and can adequately and automatically drive the discharge lamp according to the rating of the discharge lamp.

2. Description of the Related Art

In general, discharge lamps such as fluorescent lamps include preheat start type lamps and rapid start type lamps which are classified according to the starting type thereof. Such discharge lamps have various ratings and include FL (preheat type lamp) 20 type (20W), FLR (rapid start type lamp) 40 type (40W) and FLR 110 type (110W) and the like for respective outputs. The discharge lamps of the above ratings have different voltage-current characteristic curves and therefore they are driven by different inverter devices which have corresponding load curves. For example, the inverter device for the 110W discharge lamp is required to generate a starting voltage of approx. 480V when a load current is 0, and supply a load current of approx. 0.6 A after the discharge lamp is started. Thus, the inverters are required to supply different starting voltages and load currents for respective discharge lamps having different ratings. Therefore, in the prior art, inverter devices are exclusively used for corresponding discharge lamps having different ratings.

However, if different inverter devices are used for respective discharge lamps, the number of types of the discharge lamps increases and it becomes troublesome to use the discharge lamps. Further, it becomes necessary to manufacture various types of inverter devices by a small number for respective types, raising the manufacturing cost of the apparatus and making the apparatus design complicated.

SUMMARY OF THE INVENTION

An object of this invention is to provide a highly reliable discharge lamp lighting apparatus which can be commonly used for a plurality of discharge lamps having various different ratings and manufactured at a low cost and in which the design can be simplified.

According to an aspect of the present invention, there is provided a discharge lamp lighting apparatus comprising inverter means for supplying a high frequency power source to a discharge lamp having one of different ratings; voltage detecting means for detecting a load voltage applied from the inverter means to the discharge lamp; and control means for controlling the power source supplying operation of the inverter means with respect to the discharge lamp based on detection outputs of the voltage detecting means; wherein the control means includes starting voltage changing means for sequentially raising an output of the inverter means at the starting time of the discharge lamp, discharge lamp identifying means for identifying the type of the discharge lamp according to the starting voltage of the discharge lamp, and lighting control means for controlling the starting voltage and current of the discharge lamp according to the type of the discharge lamp determined based on an output of the discharge lamp identifying means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

There will now be described an embodiment of this invention with reference to the accompanying drawings.

Figure 1:
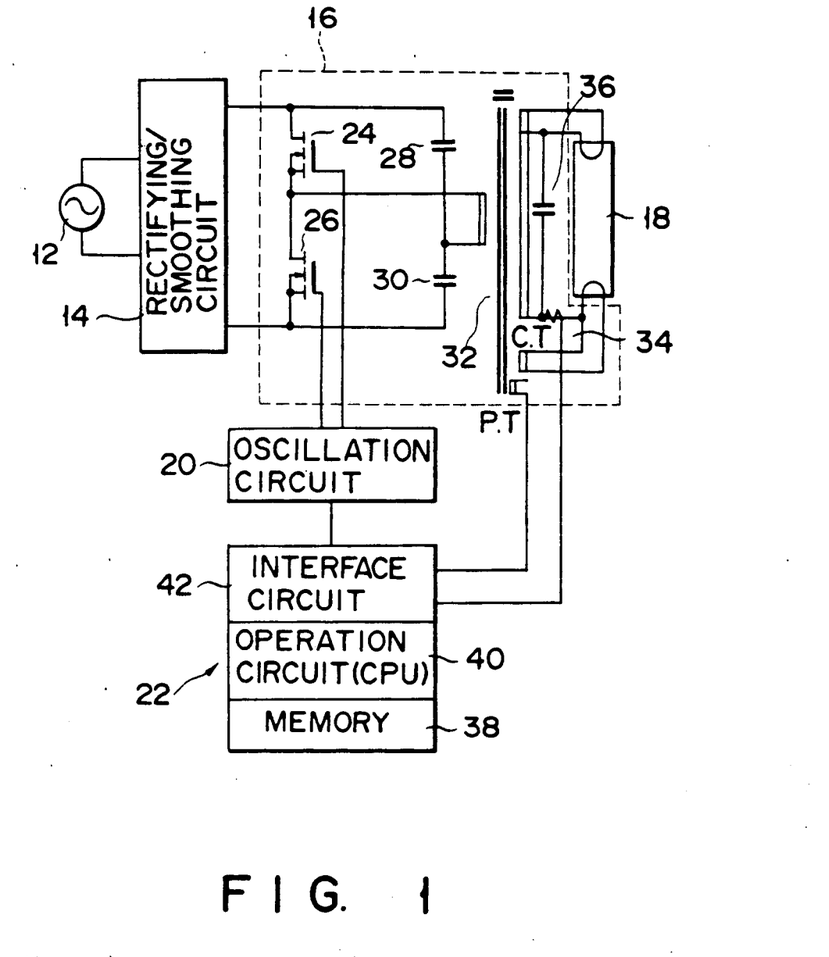
FIG. 1 is a block diagram schematically showing a discharge lamp lighting apparatus according to this invention.

FIG. 1 shows a schematic construction of a discharge lamp lighting apparatus according to an embodiment of this invention. In FIG. 1, the discharge lamp lighting apparatus includes an A.C. power source 12, a rectifying/smoothing circuit 14 connected to the A.C. power source 12 to rectify the A.C. power source, an inverter circuit 16 connected to the rectifying/smoothing circuit 14, a discharge lamp 18 which is connected to the inverter circuit 16 and is used as an illumination load such as a fluorescent lamp, an oscillation circuit 20 connected to the inverter 16 and a controlling section 22 for controlling the oscillation circuit 20.

The inverter circuit 16 includes switching transistors 24 and 26 and capacitors 28 and 30 serially connected between D.C. output terminals of the rectifying/smoothing circuit 14. Further, the inverter circuit 16 includes an inverter transformer 32 having a primary coil connected between a connection node between the switching transistors 24 and 26 and a connection node between the capacitors 28 and 30, a current transformer (CT) 34 and a starting capacitor 36.

Further, the control section 22 includes an operation circuit (CPU) 38 constructed by a microprocessor or the like, a memory 40 and an interface circuit 42.

Figure 2:
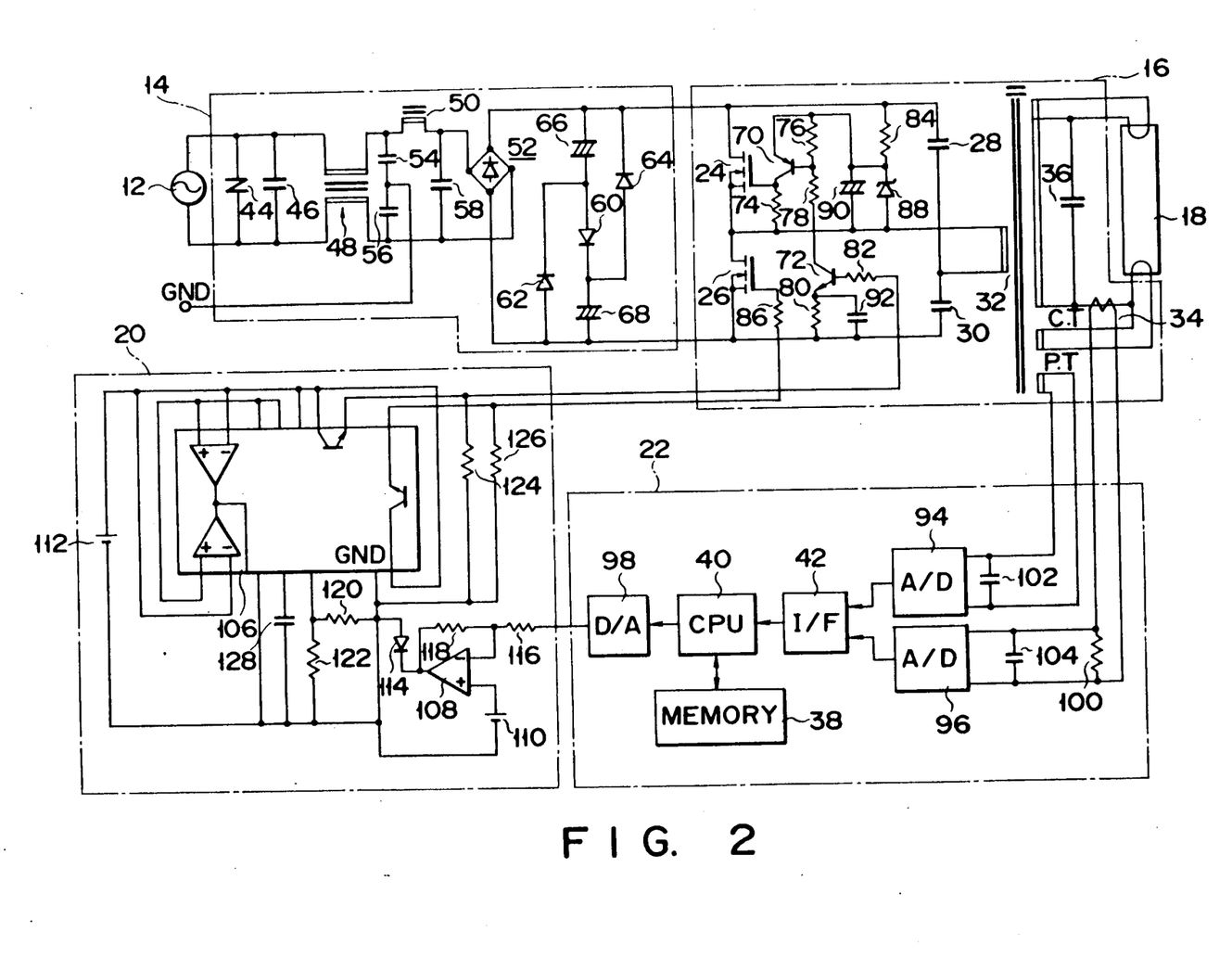
FIG. 2 is a circuit construction diagram showing an example of discharge lamp lighting apparatus of FIG. 1 more in detail.

FIG. 2 is a circuit construction diagram showing the discharge lamp lighting apparatus of FIG. 1 more in detail. In FIG. 2, the rectifying/smoothing circuit 14 includes a rectifier circuit 52 connected via transformers 48 and choke coil 50 between two terminals of an A.C. power source 12 with which a semiconductor switch 44 and a capacitor 46 are each connected in parallel and capacitors 54, 56 and 58 connected in parallel with the rectifier circuit. Further, the rectifying/smoothing circuit 14 includes diodes 60, 62 and 64 connected with the polarities as shown in FIG. 2 and capacitors 66 and 68 connected to smooth an output of the rectifier circuit 52.

The inverter circuit 16 includes transistors 70 and 72 controlled by an output of the oscillation circuit 20, resistors 74, 76, 78, 80, 82, 84 and 86, a zener diode 88 and capacitors 90 and 92 in addition to the transistors 24 and 26 and capacitors 28 and 30 shown in FIG. 1.

The control section 22 includes A/D converters 94 and 96 for A/D converting signals from the voltage detection coil PT of the inverter transformer 32 and the current transformer 34, a D/A converter 98 for D/A converting an output of the CPU 40, a resistor 100 and capacitors 102 and 104 in addition to the memory 38, CPU 40 and interface circuit 42.

The oscillation circuit 20 includes a V/F converter 106 for effecting the voltage-frequency conversion, for example. Further, the oscillation circuit 20 includes a comparator 108, D.C. power sources 110 and 112, diode 114, resistors 116, 118, 120, 122, 124 and 126 and a capacitor 128 which are connected as shown in FIG. 2.

In the apparatus of FIG. 2, when the A.C. power source 12 is turned on, an A.C. voltage is converted into a D.C. voltage by the rectifying/smoothing circuit 14 and then applied to the inverter circuit 16. In the inverter circuit 16, the switching transistors 24 and 26 are alternately turned on and off by a high-frequency signal supplied from the oscillation circuit 20. Then, a voltage of the high frequency power source is applied to the primary coil of the inverter transformer 32. As a result, the discharge lamp 18 is preheated by the action of the capacitor 36 as is well known in the art. After this, when a voltage between two electrodes of the discharge lamp 18 becomes higher than the starting voltage, the discharge lamp 18 is lighted.

When the discharge lamp 18 is lighted, signals corresponding to a current flowing in the discharge lamp 18 and a voltage applied thereto are respectively derived by means of the current transformer (CT) 34 and the voltage detection coil PT of the inverter transformer 32 and input to the CPU 40 via the interface 42.

The CPU 40 detects the rating of the discharge lamp 18 based on the starting voltage of the discharge lamp 18 as will be described later in detail. Then, it causes a power source voltage corresponding to the rating of the discharge lamp 18 to be output from the inverter circuit 16 and controls the succeeding lighting operation. In this case, the output adjustment of the inverter circuit 16 is effected by adjusting the oscillation frequency of the oscillation circuit 20, that is, an output frequency of the V/F converter 106 which changes an output frequency according to the input voltage. At this time, if the oscillation frequency becomes higher, the output of the inverter circuit 16 is lowered, and if the oscillation frequency becomes lower, the output of the inverter circuit 16 is raised. The control section 22 controls the load curve of the inverter circuit 16 by making use of the characteristic so as to cause the same to correspond to the rating of the discharge lamp 18.

Figure 3:
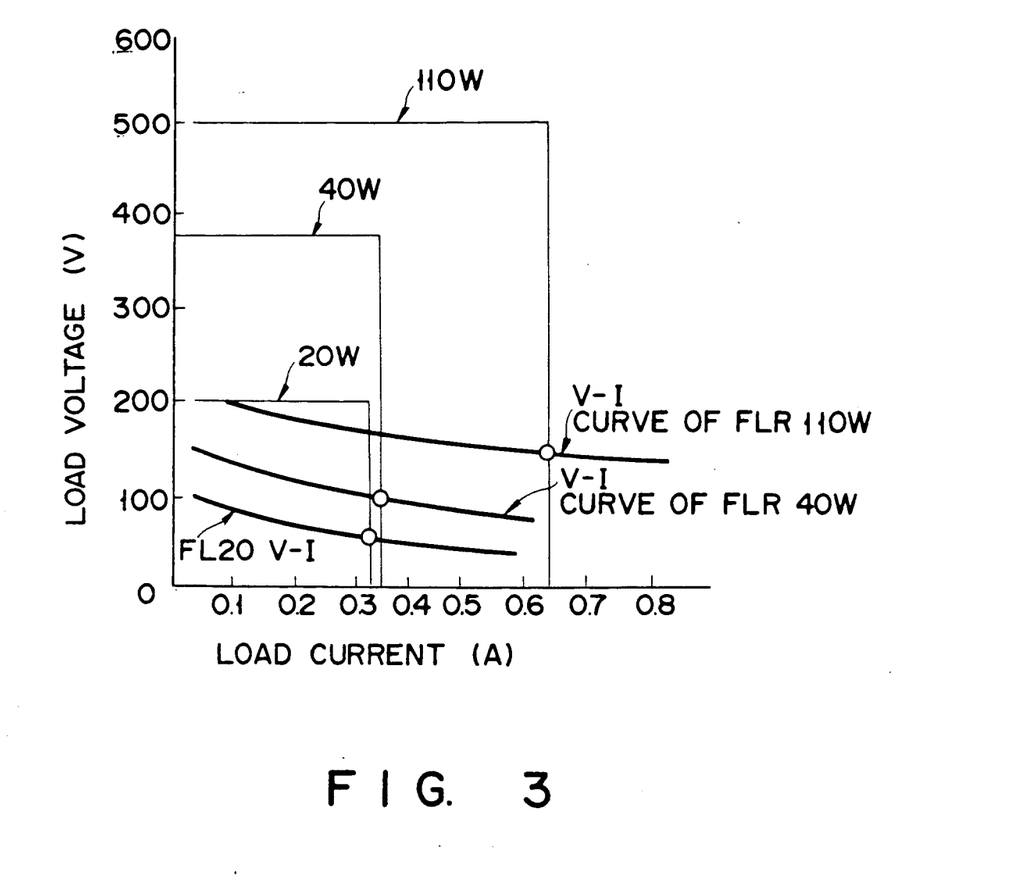
FIG. 3 is a graph showing load characteristics corresponding to various discharge lamps and attained by the discharge lamp lighting apparatus of this invention.

FIG. 3 is a graph showing the load characteristics corresponding to different types of discharge lamps of 20W type, 40W type and 110W type, for example. The output voltage and current of the inverter circuit 16 are controlled by the CPU 40 according to the type of the discharge lamp 18.

Figure 4A:
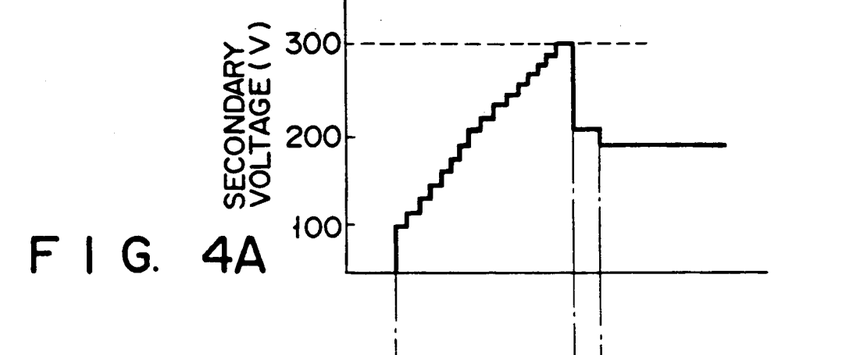
FIGS. 4A through 4C are timing charts showing variations with time in the secondary voltage of the inverter circuit of the discharge lamp lighting apparatus, lamp current and oscillation frequency.
Figure 4B:
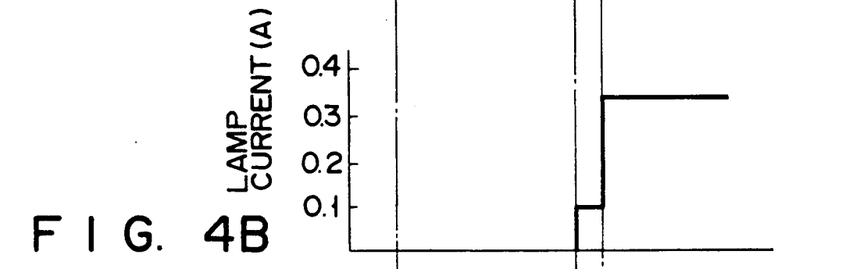
Figure 4C:
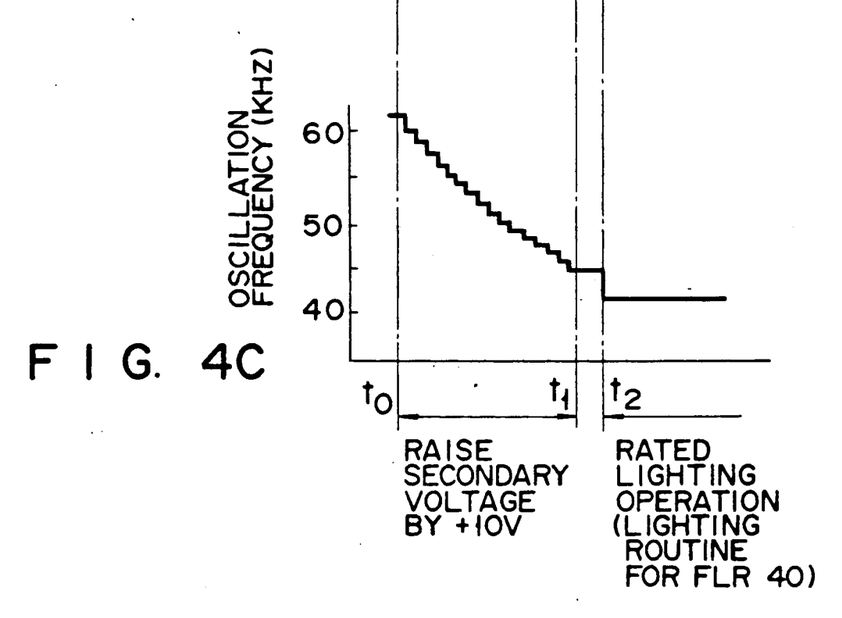
Figure 5:
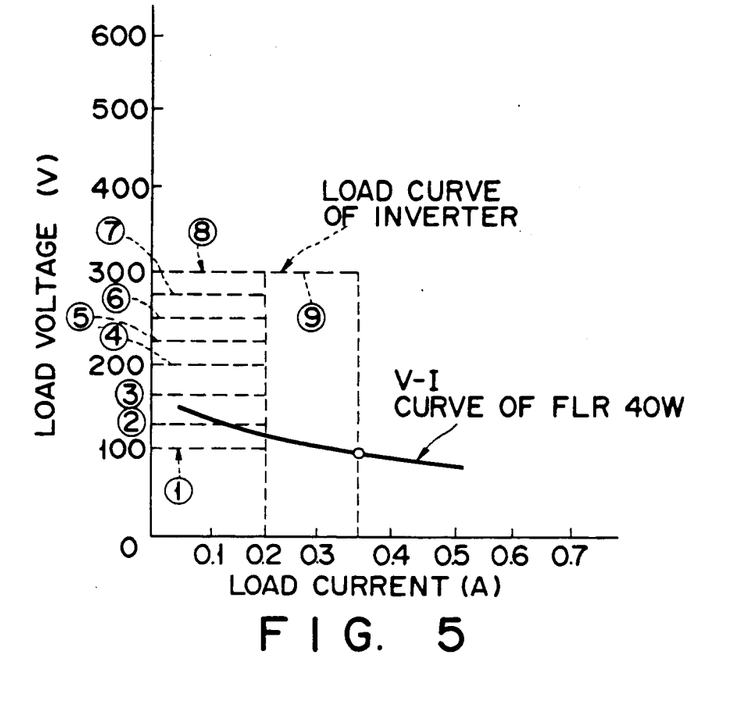
FIG. 5 is a diagram showing variation in the load characteristic corresponding to the discharge lamp at the starting time of the discharge lamp lighting apparatus.
Figure 6:
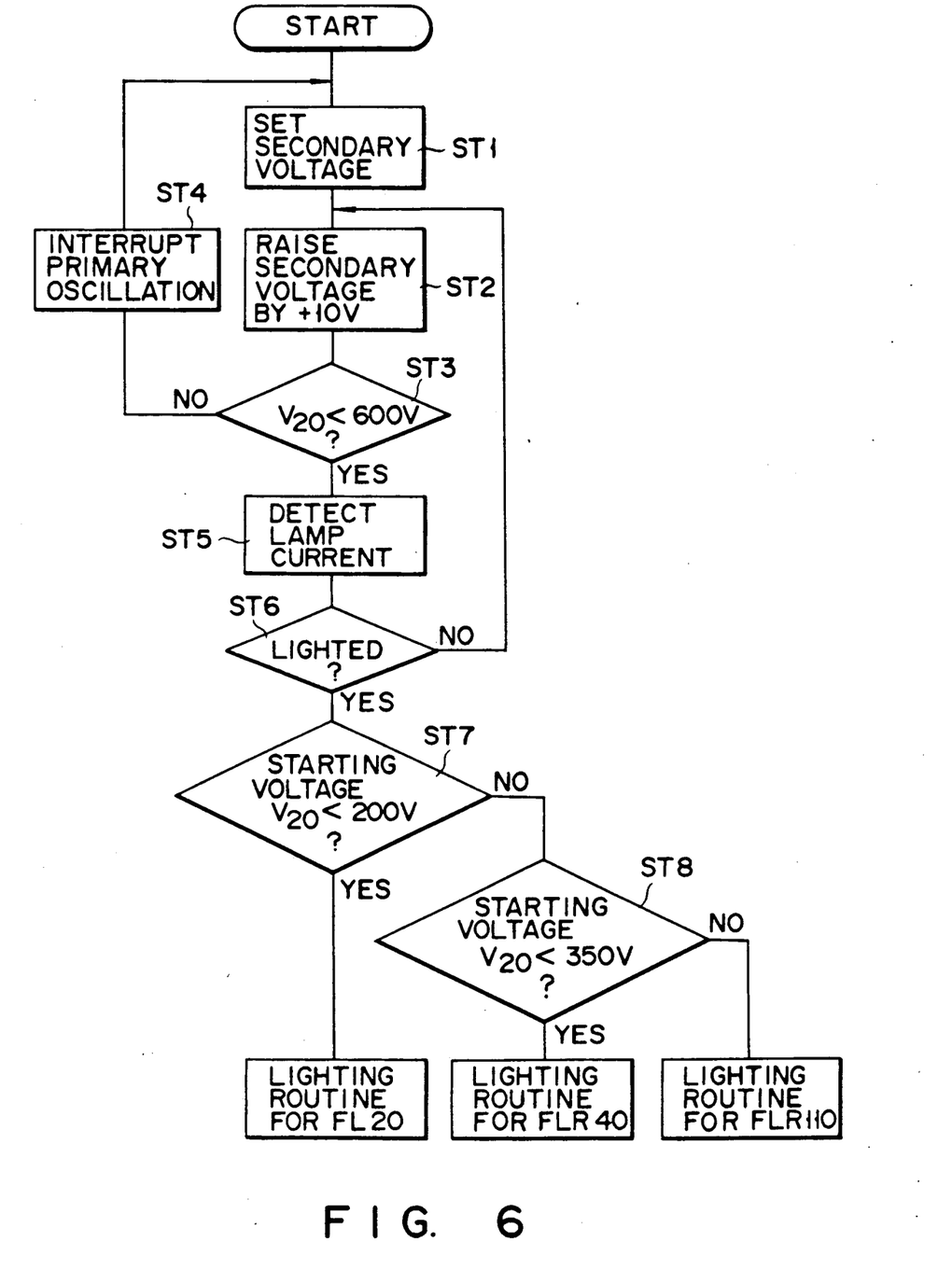
FIG. 6 is a flowchart for illustrating the operation of the discharge lamp lighting apparatus.

Next, the operation of this invention is explained with reference to the graph of FIG. 3 showing the load characteristics, the timing charts shown in FIGS. 4A through 4C, the load characteristic diagram of FIG. 5 corresponding to the discharge lamp at the starting time and the flowchart shown in FIG. 6.

For example, assume that the discharge lamp 18 of 40W (FLR 40) is mounted on the apparatus of FIG. 1. In this case, when the A.C. power source 12 is turned on, the CPU 40 of the control section 22 sets the initial value of an output voltage of the inverter circuit 16 or the secondary voltage ($V_{20}$) of the inverter transformer 32 in the step ST1. For example, the initial value is set at 100V at time $t_0$ as shown in FIG. 4A. Then, the secondary voltage is raised from the initial voltage of 100V by 10V at one time in the step ST2. In the step ST3, it is determined whether or not the secondary voltage V20 is lower than 600V, for example. At this time, if the secondary voltage V20 is not lower than 600V, it is determined that an abnormal condition has occurred and the step ST4 is effected to interrupt the oscillation of the primary side of the inverter transformer 32.

In contrast, if it is detected in the step ST3 that the secondary voltage $V_{20}$ is lower than 600V, the step ST5 is effected to determine whether the lamp current is present or not based on the output of the current transformer 34. After this, in the step ST6, it is determined whether the discharge lamp 18 is lighted or not based on the detection result of the lamp current. If it is detected in the step ST6 that the discharge lamp 18 is not lighted, the step ST2 is effected again to raise the secondary voltage $V_{20}$ by 10V. In this way, the secondary voltage $V_{20}$ of the inverter transformer 32 is raised by 10V at one time as shown in FIG. 4A, for example, and then the turn-on of the discharge lamp 18 is monitored (time $t_0$ to $t_1$). Then, if the lamp current (0.1A) is detected in the step ST5 at time $t_1$ as shown in FIG. 4B, for example, and the discharge lamp 18 is lighted in the step ST6, the step ST7 is effected to determine the value of the starting voltage ($V_{20}$) at the lighting time of the discharge lamp 18. In this case, since the discharge lamp of FLR 40 type (40W) is mounted, the secondary voltage $V_{20}$ at the time $t_1$ has reached 300V which is an approximate average voltage of the starting voltage of the FLR 40 type discharge lamp.

If the starting voltage $V_{20}$ determined in the step ST7 is lower than 200V, it is determined that an FL 20 type or 20W discharge lamp is mounted and a lighting routine for the FL 20 type discharge lamp is effected to keep the operation condition of the discharge lamp 18 in a proper range. Further, if it is determined in the step $ST_7$ that the starting voltage $V_{20}$ is not lower than 200V, then the step ST8 is effected to determine whether or not the starting voltage $V_{20}$ is lower than 350V. If it is determined in the step ST8 that the starting voltage $V_{20}$ is not lower than 200V and is lower than 350V, it is determined that an FLR 40 type or 40W discharge lamp is mounted and a lighting routine for the FLR 40 type discharge lamp is effected (after time $r_2$). If it is determined in the step ST8 that the starting voltage $V_{20}$ is not lower than 350V, it is determined that an FLR 11- type or 110W discharge lamp is mounted. Therefore, a lighting routine for the FLR 110 type discharge lamp is effected.

Each of the lighting routines is effected to supply a current corresponding to a lamp current value previously stored in the memory 38 of the control section 22 according to the type of the discharge lamp and maintain the lighted state.

Figure 7A:
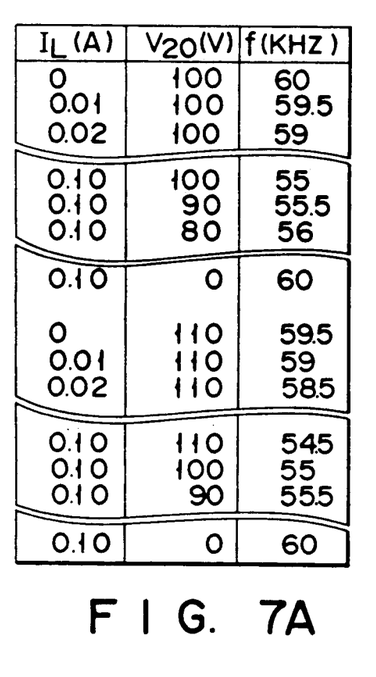
FIGS. 7A and 7B are diagrams showing examples of a memory table at the starting time and lighting time of a 40W discharge lamp.
Figure 7B:
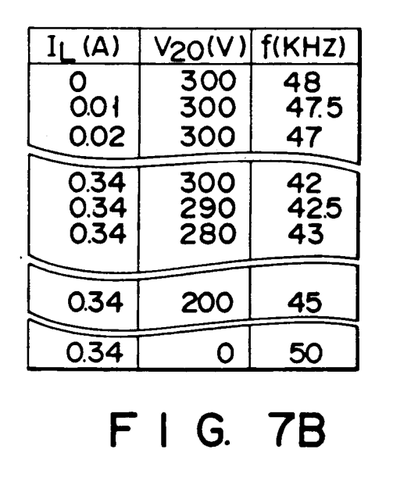

FIGS. 7A and 7B are diagrams showing examples of tables of the memory at the starting time and lighting time of a 40W discharge lamp. For example, at the starting time shown in FIG. 7A, values of lamp current $I_L$ are stored in the unit of 0.01A, values of starting voltage $V_{20}$ are stored in the unit of 10V, and values of oscillation frequency f are stored in the unit of 0.5 KHz. Likewise, at the starting time shown in FIG. 7B, values of lamp current $I_L$ are stored in the unit of 0.01A, values of starting voltage $V_{20}$ are stored in the unit of 10V, and values of oscillation frequency f are stored in the unit of 0.5 KHz. Thus, items of characteristic data of the load curves corresponding to lamps of respective ratings are stored in the memory 38. After the discharge lamp 18 is lighted, the output of the inverter circuit 16 is maintained at a proper operation point according to the above characteristic data.

In the above explanation, the discharge lamp lighting apparatus is a half-bridge type, but it is not limited to this type and a full-bridge type or other type lighting apparatus can be used, for example.

Further, fluorescent lamps of FL 20 type, FLR 40 type and FLR 110 type are used as the discharge lamp, but it is not limited to them. In addition, the lamp ratings other than the above ratings can be used, and ring-form FCL lamps, U-shaped FPL lamps can be used, for example.

Further, in the above example, a discharge lamp is mounted on one discharge lamp lighting apparatus, but discharge lamps connected in series or discharge lamps connected in parallel can be used.

Figure 8:
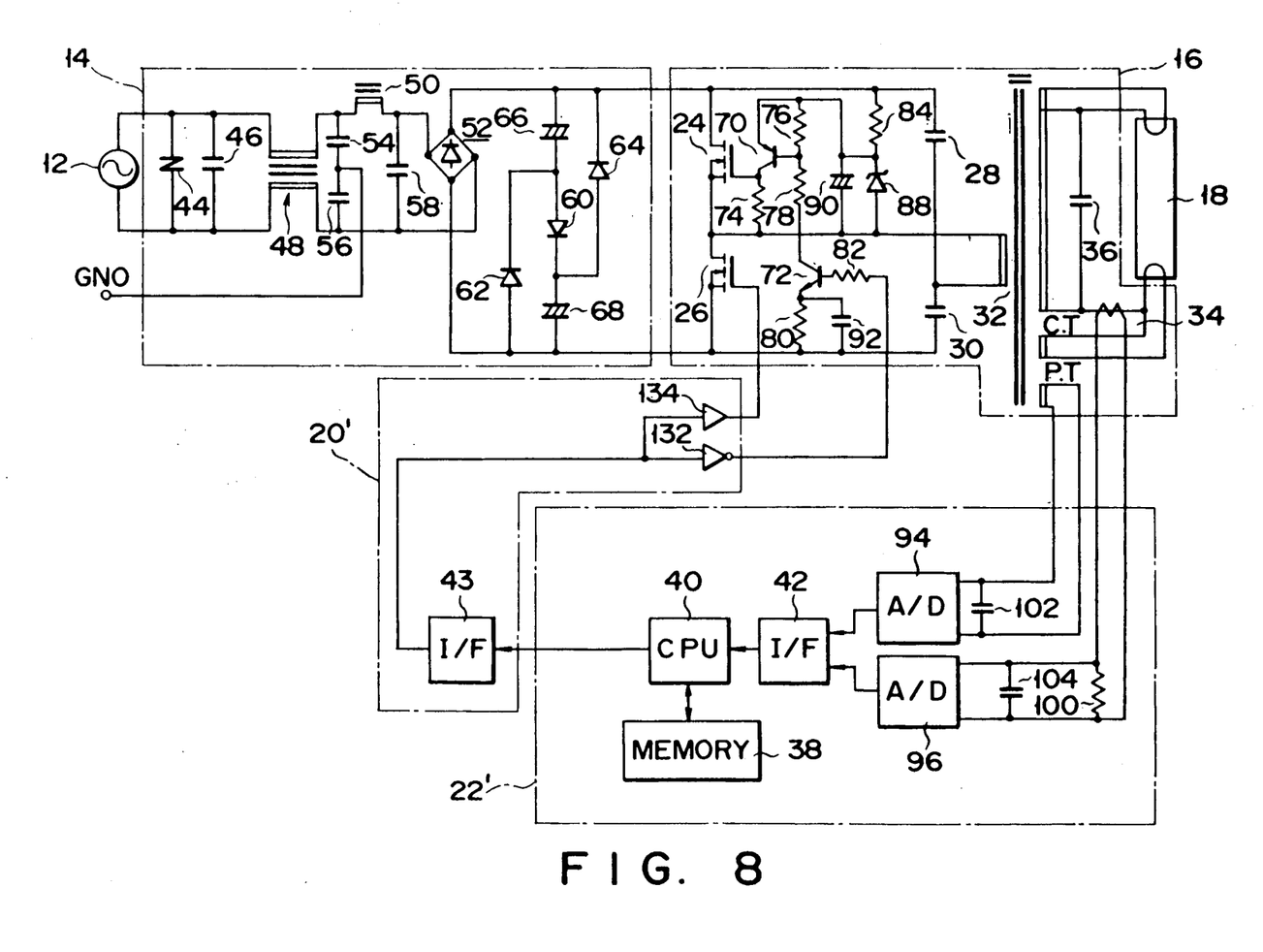
FIG. 8 is a circuit construction diagram showing another example of discharge lamp lighting apparatus of FIG. 1 more in detail.

FIG. 8 is a circuit construction diagram showing the discharge lamp lighting apparatus of FIG. 1 more in detail. In FIG. 8, portions which are the same as those of FIG. 3 are denoted by the same reference numerals, and only portions which differ from those of FIG. 3 are explained.

That is, the rectifying/smoothing circuit 14 and inverter circuit 16 are formed with the same constructions of FIG. 3. A control section 22' is formed with a construction which can be obtained by omitting the D/A converter 98 from the control section 22 of FIG. 3. An oscillation circuit 20' is constructed to receive an output of the CPU 40 at an interface circuit 3 and then supply the same to an inverter circuit 16 via inverter circuit 132 and buffer circuit 134.

With the discharge lamp lighting apparatus of the above construction, the output frequency of the oscillation circuit 20' can be adjusted by changing the number of clocks in the CPU 40. The control section 22' controls the load curve of the inverter circuit 16 by making use of the above property so as to cause the same to correspond to the rating of the discharge lamp 18.

FIGS. 9 through 13 are diagrams showing examples of different circuit constructions of the inverter circuit of FIG. 1. In the circuit construction diagrams of FIGS. 9 through 13, portions which are the same as those in the former embodiment are denoted by the same reference numerals and only different portions are explained.

Figure 9:
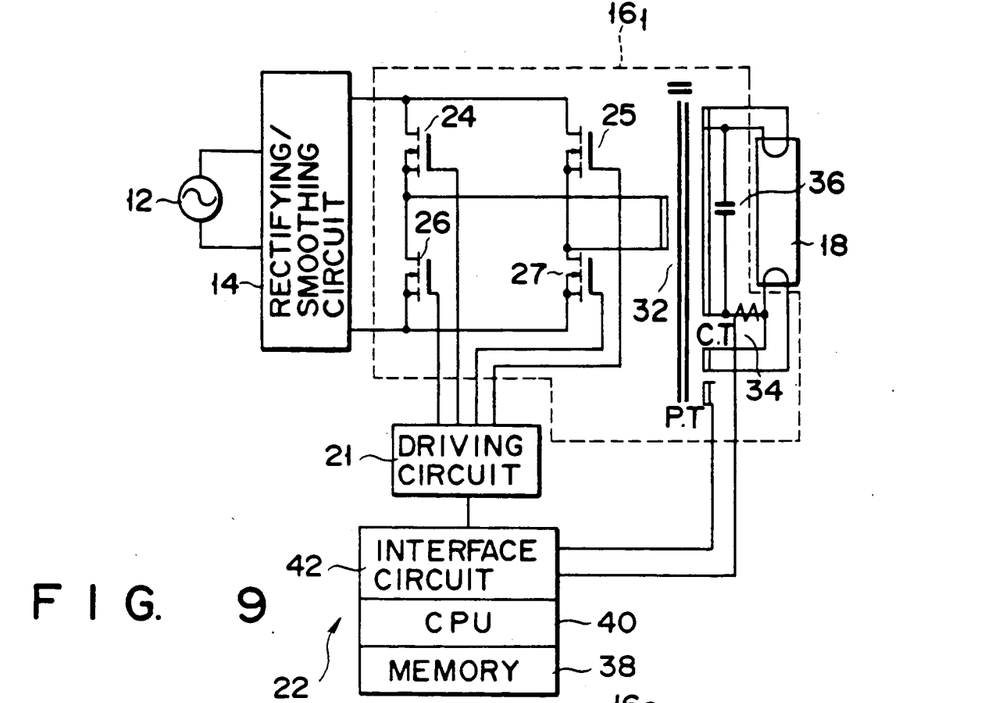
FIGS. 9 through 13 are diagrams showing examples of different circuit constructions of the discharge lamp lighting apparatus of FIG. 1.

FIG. 9 shows an example of a full-bridge type discharge lamp lighting apparatus which includes two switching transistors 25 and 27 arranged in an inverter circuit 161 in addition to the switching transistors 24 and 26. The switching transistors 24, 25, 26 and 27 are controlled by a driving circuit 21 which receives a signal from the interface circuit 42 of the control section 22. With the above construction, the load on the switching transistors can be alleviated in comparison with the half-bridge type discharge lamp lighting apparatus shown in FIG. 1 Therefore, it is suitable for a load of large capacity.

Figure 10:
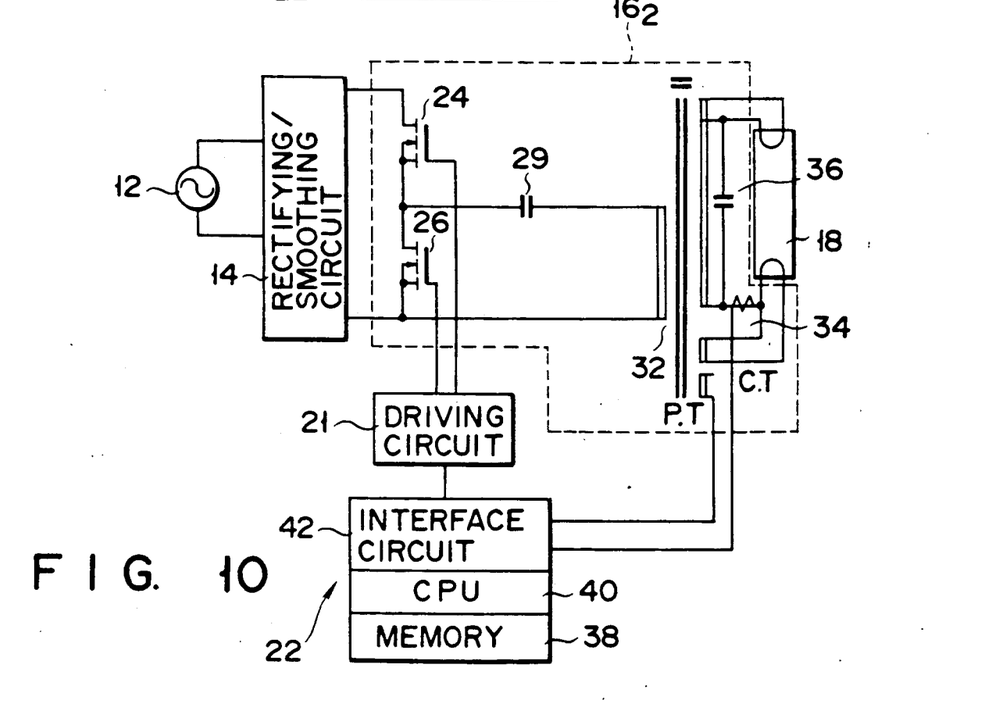

FIG. 10 shows an example of a discharge lamp lighting apparatus constructed by modifying a half-bridge type discharge lamp lighting apparatus and obtained by omitting the voltage dividing capacitors 28 and 30 from the inverter circuit 16 of the discharge lamp lighting apparatus shown in FIG. 1 and connecting a capacitor 29 between the primary coil of the inverter transformer 32 and a connection node between the switching transistors 24 and 26. The switching transistors 24 and 26 are controlled by the driving circuit 21.

Figure 11:
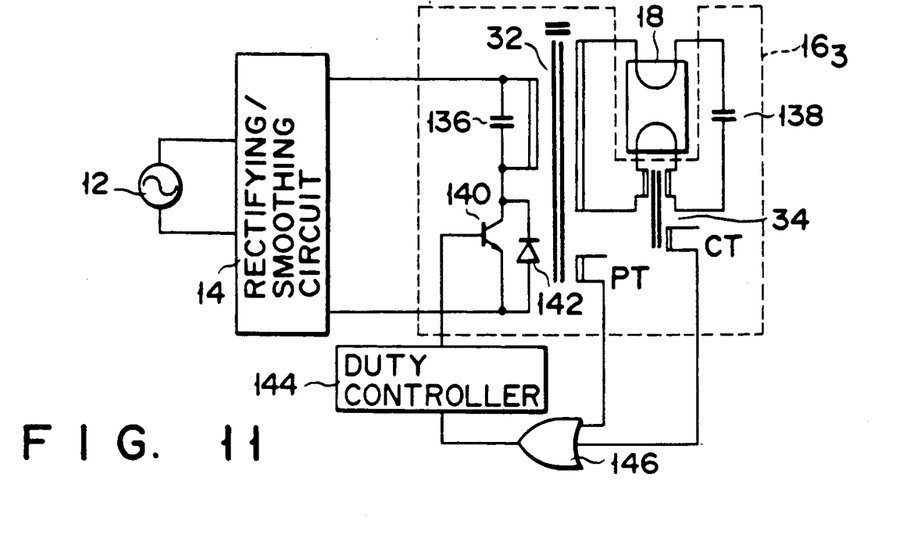

FIG. 11 shows an example of a one-transistor type inverter circuit 163 in which a resonance capacitor 136 is connected in parallel with the primary coil of the inverter transformer 32 and a starting capacitor 138 is connected between two terminals of the discharge lamp 18. Further, a parallel circuit of a switching transistor 140 and a diode 142 is connected in series with the primary coil of the inverter transformer 32. The switching transistor 140 is controlled by a duty controller 144. The duty controller 144 controls the switching transistor 140 according to an output of an OR circuit 146 to which outputs of the current transformer (CT) 34 and the voltage detection coil of the inverter transformer 32 are input.

Figure 12:
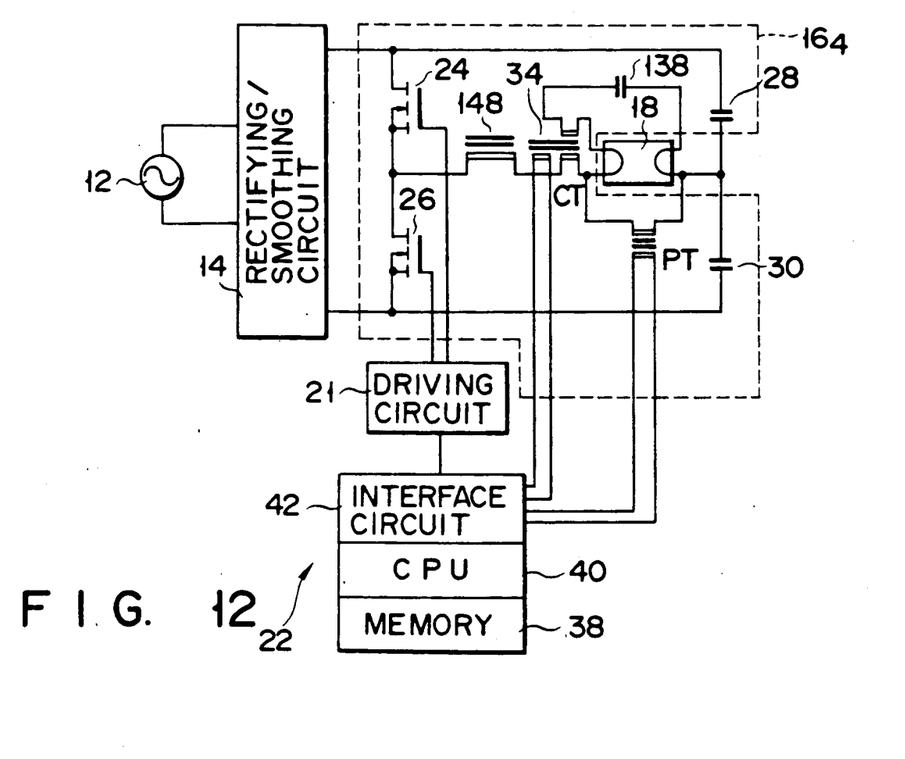

FIG. 12 shows an example of a direct-coupled type half-bridge inverter circuit 16$_4$ in which the current transformer 34 is connected to a connection node between the switching transistors 24 and 26 via a choke coil 148. A starting capacitor 138 is connected between the two terminals of the discharge lamp 18. Thus, the inverter transformer 32 which is used in the former embodiment is not used in the inverter circuit 164, making it possible to reduce the whole size of the apparatus.

Figure 13:
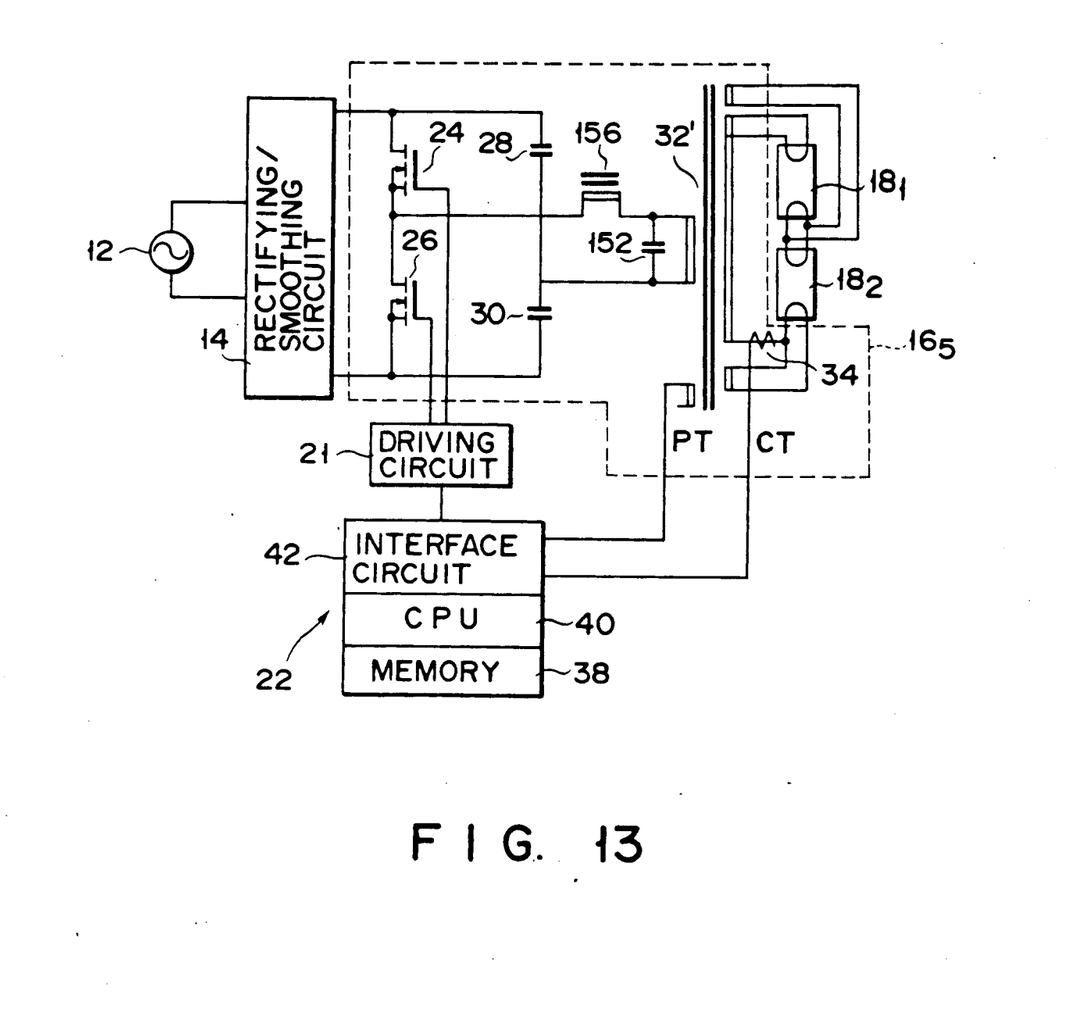

FIG. 13 shows an example in which a ballast is used in the inverter circuit and two discharge lamps are serially connected. In FIG. 13, a ballast 150 is connected as a different inductance between the primary coil of the inverter transformer 32' and a connection node between the switching transistors 24 and 26 and a capacitor 152 is connected in parallel with the primary coil. In addition, two discharge lamps 18$_1$ and 18$_2$ are serially connected on the secondary coil side of the inverter transformer 32'. With this construction, the total size of the discharge lamp lighting apparatus for one discharge lamp can be reduced and the design for the inverter transformer can be simplified.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A discharge lamp lighting apparatus comprising:
   inverter means for supplying a high frequency power source to a discharge lamp having one of different ratings;
   voltage detecting means for detecting a load voltage applied from said inverter means to said discharge lamp; and
   control means for controlling the power source supplying operation of said inverter means with respect to said discharge lamp based on detection outputs of said voltage detecting means, said control means includes starting voltage changing means for sequentially raising an output of said inverter means at the starting time of said discharge lamp, discharge lamp identifying means for identifying the type of said discharge lamp according to the starting voltage of said discharge lamp, and lighting control means for controlling the starting voltage and current of said discharge lamp according to the type of said discharge lamp determined based on an output of said discharge lamp identifying means.

2. An apparatus according to claim 1, wherein said lighting control means includes frequency varying means for changing the frequency according to the type of said discharge lamp determined based on an output of said discharge lamp identifying means to control the power source supplying operation of said inverter means.

3. An apparatus according to claim 2, wherein said frequency varying means includes a voltage-frequency converter for converting an output frequency according to an output of said discharge lamp identifying means.

4. An apparatus according to claim 1, wherein said lighting control means includes memory means in which load characteristics corresponding to the types of discharge lamps are stored and said lighting control means controls the lighting voltage and current of said discharge lamp according to the load characteristic stored in said memory means and corresponding to the type of said discharge lamp determined based on an output of said discharge lamp identifying means.

5. An apparatus according to claim 1, wherein said starting voltage changing means sequentially raises an output of said inverter means from a preset initial value by a preset amount at one time until said discharge lamp is lighted.

6. An apparatus according to claim 1, wherein said control means further includes clock generation means and controls the power source supply operation of said inverter means by changing the frequency according to the type of said discharge lamp determined based on an output of said discharge lamp identifying means and according to variation in the number of clocks output from said clock generating means in a preset period of time.

7. An apparatus according to claim 1, further comprising current detecting means for detecting a load current supplied from said inverter means to said discharge lamp, wherein said control means controls the power source supplying operation of said inverter means with respect to said discharge lamp based on detection outputs of said voltage detecting means and said current detecting means.

8. An apparatus according to claim 1, wherein said inverter means includes two switching elements having one end and the other end of a current path connected in series with said high frequency power source and a control electrode connected to said control means, two voltage dividing capacitors connected in parallel with said high frequency power source, an inverter transformer having a primary coil connected between a connection node between said two switching elements and a connection node between said two voltage dividing capacitors and a secondary coil connected between the two terminals of said discharge lamp, and a starting capacitor connected in parallel with the secondary coil of said inverter transformer.

9. An apparatus according to claim 1, wherein said inverter means includes a first series circuit of two switching elements having one end and the other end of a current path connected in series with said high frequency power source and a control electrode connected to said control means, a second series circuit connected in parallel with said first series circuit and including two switching elements having one end and the other end of a current path connected in series with said high frequency power source and a control electrode connected to said control means, an inverter transformer having a primary coil connected between a connection node between said two switching elements of said first series circuit and a connection node between said two switching elements of said second series circuit and a secondary coil connected between the two terminals of said discharge lamp, and a starting capacitor connected in parallel with the secondary coil of said inverter transformer.

10. An apparatus according to claim 1, wherein said inverter means includes two switching elements having one end and the other end of a current path connected in series with said high frequency power source and a control electrode connected to said control means, two voltage dividing capacitors connected in parallel with said high frequency power source, an inverter transformer having a primary coil connected between one end and the other end of the current path of one of said two switching elements via a capacitor and a secondary coil connected between the two terminals of said discharge lamp, and a starting capacitor connected in parallel with the secondary coil of said inverter transformer.

11. An apparatus according to claim 1, wherein said inverter means includes a switching element having a current path connected at one end to said high frequency power source and a control electrode connected to said control means, a resonance capacitor connected to the other end of said switching element and said high frequency power source, an inverter transformer having a primary coil connected in parallel with said resonance capacitor and a secondary coil connected between the two terminals of said discharge lamp, and a starting capacitor connected in parallel with the secondary coil of said inverter transformer.

12. An apparatus according to claim 11, further comprising current detecting means for detecting a load current supplied from said inverter means to said discharge lamp, wherein said control means includes an OR circuit supplied with detection outputs of said voltage detecting means and said current detecting means and means for controlling the duty of said inverter means based on an output of said OR circuit.

13. An apparatus according to claim 7, wherein said inverter means includes two switching elements having one end and the other end of a current path connected in series with said high frequency power source and a control electrode connected to said control means, two voltage dividing capacitors connected in parallel with said high frequency power source, a ballast connected between said current detecting means and one end and the other end of the current path of said two switching elements, and a starting capacitor connected between two terminals of said discharge lamp.

14. An apparatus according to claim 1, wherein said inverter means includes two switching elements having one end and the other end of a current path connected in series with said high frequency power source and a control electrode connected to said control means, two voltage dividing capacitors connected in parallel with said high frequency power source, an inverter transformer having a primary coil connected between a connection node between said two switching elements and a connection node between said two voltage dividing capacitors via an inductor and a secondary coil connected between the two terminals of said discharge lamp, and a resonance capacitor connected in parallel with the primary coil of said inverter transformer.

* * * * *